(12) United States Patent
Mehta et al.

(10) Patent No.: US 9,983,945 B2
(45) Date of Patent: May 29, 2018

(54) METHODS AND SYSTEMS FOR MANAGING THE REPLICATION OF SNAPSHOTS ON A STORAGE ARRAY

(71) Applicant: HEWLETT PACKARD ENTERPRISE DEVELOPMENT LP, Houston, TX (US)

(72) Inventors: Varun Mehta, Los Altos Hills, CA (US); Rod Bagg, San Jose, CA (US); Vikas Gupta, Santa Clara, CA (US); Dan Leary, San Jose, CA (US); Ajay Singh, San Francisco, CA (US); Hector Yuen, Santa Clara, CA (US)

(73) Assignee: Hewlett-Packard Enterprise Development LP, Houston, TX (US)

( * ) Notice: Subject to any disclaimer, the term of this patent is extended or adjusted under 35 U.S.C. 154(b) by 0 days. days.

(21) Appl. No.: 15/388,199

(22) Filed: Dec. 22, 2016

(65) Prior Publication Data

US 2017/0161152 A1     Jun. 8, 2017

Related U.S. Application Data

(63) Continuation of application No. 15/060,283, filed on Mar. 3, 2016, now Pat. No. 9,563,378, which is a
(Continued)

(51) Int. Cl.
*G06F 3/06* (2006.01)
*G06F 11/14* (2006.01)
*G06F 17/30* (2006.01)

(52) U.S. Cl.
CPC ........ *G06F 11/1451* (2013.01); *G06F 3/0619* (2013.01); *G06F 3/0665* (2013.01);
(Continued)

(58) Field of Classification Search
CPC ............ G06F 11/1451; G06F 11/1461; G06F 3/0619; G06F 3/0665; G06F 3/0689; G06F 17/30501; G06F 2201/84
See application file for complete search history.

(56) References Cited

U.S. PATENT DOCUMENTS

| 6,065,102 | A | 5/2000 | Peters et al. |
| 7,921,262 | B1 * | 4/2011 | Dash ..................... G06F 3/0607 711/154 |

(Continued)

OTHER PUBLICATIONS

Flynn, Shannon, "SnapManager 4.0 for Microsoft Exchange", NetApp (Jan. 2007), Best Practices Guide, TR-3541, 30 pages.
(Continued)

*Primary Examiner* — Larry T Mackall

(57) ABSTRACT

A storage management application of a storage array is operable to create a new volume on the storage device array, and to automatically configure, responsive to user selection of an application protection profile, data protection services for application data to be stored on the volume, and/or, responsive to user selection of an application performance profile, application specific performance parameters. The application protection profile specifies scheduling and replication of snapshots for application data to be stored on the volume, and the application performance profile specifies performance parameters such as setting a block size, enabling or modifying a data caching algorithm, turning on or modifying data compression, etc. The scheduling, replication and/or application performance may be managed by a daemon associated with the storage management application which communicates with an agent associated with an application server on which the application executes.

20 Claims, 1 Drawing Sheet

Related U.S. Application Data continuation of application No. 12/836,467, filed on Jul. 14, 2010, now Pat. No. 9,317,368.

(52) U.S. Cl.
CPC ........ *G06F 3/0689* (2013.01); *G06F 11/1461* (2013.01); *G06F 17/30501* (2013.01); *G06F 2201/84* (2013.01)

(56) References Cited

U.S. PATENT DOCUMENTS

| | | | |
|---|---|---|---|
| 2004/0172577 A1* | 9/2004 | Tan | G06F 11/1446 714/13 |
| 2005/0154852 A1* | 7/2005 | Nakagawa | G06F 3/0605 711/170 |
| 2005/0182910 A1* | 8/2005 | Stager | G06F 11/1456 711/162 |
| 2008/0148000 A1 | 6/2008 | Ranganathan et al. | |
| 2008/0243866 A1 | 10/2008 | Pandey | |
| 2010/0250880 A1* | 9/2010 | Mimatsu | G06F 11/1451 711/162 |
| 2011/0107043 A1 | 5/2011 | Palagummi | |
| 2014/0089618 A1* | 3/2014 | Pattar | G06F 3/0613 711/166 |

OTHER PUBLICATIONS

"Reliable Backup and Recovery Designed for Your Growing Business", Symantec (2010), Data Sheet: Data Protection, Symantec BackupExec 2010, 4 pages.

"The Symantec NetBackup Platform: Complete protection for your information-driven enterprise", Symantec (2009), Data Sheet: Data Protection, Symantec NetBackup 7, 8 pages.

"Host Integration Tools", Dell EqualLogic, Auto-Snapshot Manager/Microsoft Edition, User Guide Version 3.2 (Mar. 2009), 218 pages.

"PS Series Storage Arrays", Dell Inc., EqualLogic, Group Administration, PS Series Firmware Version 5.0 (Jun. 2010), 256 pgs.

Symantec Corporation, "Symantec Backup Exec™ 2010: Reliable Backup and Recovery Designed for Your Growing Business," Jan. 2010, Data Sheet: Data Protection, <http://eval.symantec.com/mktginfo/enterprise/fact_sheets/b-backup_exec_2010_DS_20962742.en-us.pdf>.

* cited by examiner

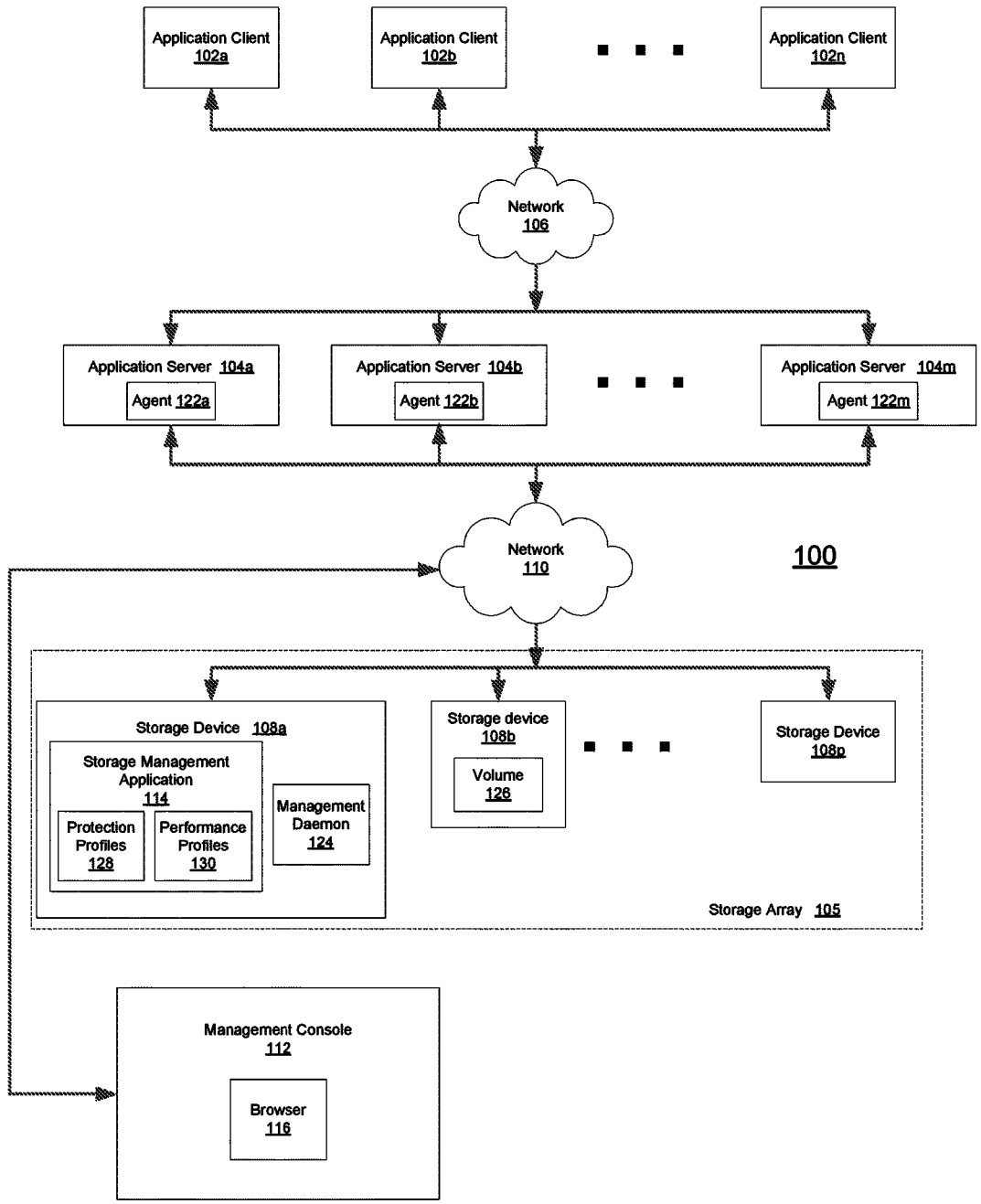

METHODS AND SYSTEMS FOR MANAGING THE REPLICATION OF SNAPSHOTS ON A STORAGE ARRAY

RELATED APPLICATIONS

The present application is a Continuation of U.S. patent application Ser. No. 15/060,283 filed on Mar. 3, 2016 (now issued as U.S. Pat. No. 9,563,378), which is a Continuation of U.S. patent application Ser. No. 12/836,467 filed on Jul. 14, 2010 (now issued as U.S. Pat. No. 9,317,368), both of which are incorporated herein by reference.

FIELD OF THE INVENTION

The present invention relates to methods and systems for providing unified management of storage and application consistent snapshots.

BACKGROUND

Modern computer networks exhibit the need for ever increasing amounts of storage for data and applications consumed and used in such networks. As the number of storage devices used by an enterprise increases, the complexity associated with managing those devices likewise increases. Thus, it is usually the case that the storage devices (which may be configured in an array of heterogeneous or homogeneous storage devices) are managed via a dedicated management console.

Using such management consoles, administrators are able to create volumes on the storage devices, which volumes are, in turn, accessed by applications running on application servers. Examples of applications include file servers, e-mail servers, database managers, and virtual machines. The data associated with these applications ("application data") needs to be protected to enable recovery in case of accidental erasure, natural or other disasters, or to meet regulatory or other compliance requirements. Hence, it is common for administrators to take snapshots of the application data (i.e., make point-in-time copies thereof) and either store these snapshots in place on the storage array or move the snapshots to a secondary storage system that might have a different storage medium. To enable quick and reliable recovery, it is generally the case that the applications are placed in a quiescent state prior to the snapshot being taken, hence, the snapshots are known as application consistent snapshots.

In current practice, the management of application consistent snapshots is done either directly on the application server or on a separate backup server. For example, storage array vendors currently provide application-specific managers that are installed on individual application servers. These solutions allow administrators to schedule application consistent snapshots and initiate further data protection activities, but result in significant administrative burden because of the proliferation of application managers necessitated by their application-specific nature. In addition, with such solutions provisioning of the storage is kept separate from the data protection practices. Likewise, in the case of backup servers, the division between provisioning storage and protecting it is maintained. The former must be done on the storage array, while the latter is done on the backup server once the backup copies of the application data have been made. Consequently, these existing solutions for storage management and data protection have created multiple management points and separate sets of activities for provisioning and protecting storage in an application consistent manner.

SUMMARY OF THE INVENTION

In various embodiments, the present invention provides a storage management application operable to create, responsive to user input, a new volume on at least one storage device of a storage device array, and to automatically configure, responsive to user selection of an application protection profile, data protection services for application data to be stored on the volume. The application protection profile specifies scheduling and replication of snapshots for application data to be stored on the volume, for example application data of an application running on an application server that makes use of the storage device array. Associated application performance profiles may also be selected by the user. These performance profiles specify automatically set application specific performance parameters such as block sizes, data caching algorithms or data compression, amongst other attributes. The scheduling and replication may be managed by a daemon associated with the storage management application and which is communicatively coupled to a protection manager agent executing on the application server. The application protection profile may be a pre-configured application protection profile, or may be a user-specified application protection profile if no appropriate pre-configured application protection profile is available.

These and further embodiments of the present invention are discussed below.

BRIEF DESCRIPTION OF THE DRAWINGS

The present invention is illustrated by way of example, and not limitation, in the figures of the accompanying drawings in which FIG. 1 illustrates an example of a network environment in which a storage management application configured in accordance with an embodiment of the present invention may be instantiated.

DETAILED DESCRIPTION

The present inventors have devised new techniques that unify and simplify the act of provisioning storage for an application and protecting the data stored thereon in an application consistent manner. In one embodiment of the present invention, protection manager agents are installed on the various application servers used by an enterprise. These agents are controlled and managed by a centralized management daemon that runs within a storage array, or, alternatively, on a separate management console. When new storage is to be allocated for a specific application that makes use of the storage array, an administrator, accesses a storage management application for the storage array (e.g., via the management console) and need only name and, optionally, select access control rights for a new volume; select the size of the volume required; and select one of a number of pre-configured application performance and protection profiles or templates (e.g., for applications such as e-mail servers, databases, virtual machines, file servers, etc.). The protection profiles manage both the scheduling and the replication of application specific snapshots by communicating (via the daemon) with the appropriate application servers through the protection manager agents. The performance profiles specify automatically set application specific performance parameters such as block sizes, data caching algorithms or data compression, amongst other attributes. This frees the administrator from having to use different management interface(s), potentially on another system, to manage protection of application-specific data. If none of the pre-configured application performance or protection profiles exactly meets the administrator's needs, the administrator may modify any of the existing profiles or create new profiles.

Throughout the present description, reference will be made to a storage management application. In the illustrated embodiment, that application is hosted within the storage array itself, for example, on one of the storage devices that makes up the array. However, in other embodiments the application may be hosted on a management console, that is a console for use by an administrator overseeing the management of the array of storage devices. The management console need not be a dedicated resource and may be an appropriately configured client computer system communicatively coupled to the storage devices via a network (as discussed below with reference to FIG. 1), or other communications means. The storage devices may be heterogeneous devices or homogeneous devices. The various configuration activities performed by the administrator via the storage management application may generally be communicated to the individual storage devices through one or more of Simple Network Management Protocol (SNMP) communications, remote shell (rsh) commands, secure shell (ssh) commands, and/or specific application programming interfaces (APIs). In any of these instances, the administrator at the management console may access the storage management application via a web browser. Where the storage management application is hosted on the management console, similar communication paths may be used to issue configuration information to the storage devices.

FIG. 1 illustrates an environment 100 within which embodiments of the present invention may be instantiated. A number of application clients 102a-102n access various application servers 104a-104m via a local area network, or other network, 106. The application clients may run on one or more workstations, personal computers or other computing platforms. The application servers may be associated with one or more server platforms and, in some instances, may be associated with virtualized environments. Network 106 may be any form of communications means and, in some cases, may be individual communications links, or one or more communications networks, including private networks, public networks and/or virtual private networks over public networks.

The application servers 104a-104m are communicatively coupled to an array 105 of storage devices 108a-108p, via a network 110, which may be the same network (or a portion of) network 106. As indicated above, a management console 112 is likewise coupled to network 110 and provides an administrator the ability to configure the storage array, for example via a web browser 116 to access a storage management application 114 running on the one of the storage devices 108a. Storage media associated with storage device 108a may be used as a storage location for computer readable instructions which, when executed by the storage device (e.g., one or more computer processors thereof), cause the storage device to execute administrative processes associated with managing the storage array as discussed herein. Such computer-implemented processes or methods (a.k.a. programs or routines) may be rendered in any computer readable language. Any of storage devices 108a-108p may act as the host of the storage management application and associated daemon.

The storage management application 114 is configured to provide for provisioning storage for an application and protecting the data stored thereon in an application consistent manner. As shown, protection manager agents 122a-122m are installed on the application servers 104a-104m. These agents are controlled and managed by a management daemon 124 that runs in the storage array (e.g., on the same storage device 108a as the storage management console or on a different storage device of the array). In some instances, the daemon may be a logical portion of the storage management application 114, but this need not necessarily be the case.

When new storage is to be allocated for a specific application that makes use of the storage array, an administrator may access the storage management application 114 via the storage management console 112 (e.g., via an appropriate user interface using a Web browser or command line interface), and may create, name and, optionally, select access control rights for a new volume 126 on one or more of the storage devices 108a-108p of the storage array. Via the same interface, the administrator also selects the size of the volume required. Finally, the administrator selects one of a number of pre-configured application protection profiles or templates 128 (e.g., for applications such as e-mail servers, databases, virtual machines, file servers, etc.) and/or performance profiles 130 available from the storage management application.

The protection profiles 128 provide pre-configured sets of instructions for the daemon 124 to automatically manage both the scheduling and the replication of application specific snapshots by communicating with the appropriate application servers 104a-104m through the respective protection manager agents 122a-122m. This frees the administrator from having to use different management interface(s), potentially on other systems, to manage protection of application-specific data. If none of the pre-configured application protection profiles 128 exactly meets the administrator's needs, the storage management application is configured to allow the administrator to modify an existing profile or to create and store a new protection profile.

The pre-configured performance profiles 130 may specify automatically set application specific performance parameters in addition to the protection schedules for snapshots and replication. The performance parameters can relate to qualities such as setting an appropriate block size, enabling or modifying data caching algorithms or turning on or modifying data compression, amongst other attributes. Like the protection profiles, users have the ability to independently modify any of these attributes if the pre-configured options are not suitable or create new performance profiles.

This approach has several advantages over existing techniques for managing storage and application consistent snapshots. First, the present approach unifies the acts of provisioning storage and protecting the application data stored thereon. Via a single interface and application, administrators are able to provision the storage and select and instantiate a data protection profile appropriate to the subject application from which the data originates. Second, this new approach makes it simple and straight forward for administrators to protect data associated with commonly used applications through the use of pre-configured templates appropriate to those data types and application use cases. Third, the present invention provides a single console to both manage and protect application specific storage and thus eliminates the need for additional such consoles dedicated to these individual functions. Fourth, the present invention optimizes the underlying performance characteristics of the storage device(s) to match requirements of each individual application, simplifying management and improving overall application performance.

Thus, methods and systems for providing unified management of storage and application consistent snapshots have been described. As should be evident from the foregoing description, various embodiments of the present invention may be implemented with the aid of computer-implemented processes or methods (a.k.a. programs or routines) that may be rendered in any computer language. Such processes are meant to encompass any series of logical steps performed in a sequence to accomplish a given purpose. The operations of the storage management application and the associated daemons and agents, were discussed in terms of algorithms and operations on data within a memory or buffer and these algorithms and operations were intended to convey the nature of computer programs sufficient to direct the operations of the storage management console and the associated storage devices to perform the desired tasks. Hence, it should be appreciated that the use of terms such as "processing", "computing", "calculating", "determining", "displaying" or the like, refer to the action and processes of an appropriately programmed computer system, or similar electronic computing device, which executes the processes described herein. The computer programs that embody these processes may be stored in a computer readable storage medium, such as, but not limited to, any type of disk including floppy disks, optical disks, compact disk read only memories (CD-ROMs), and magnetic-optical disks, read-only memories (ROMs), flash drives, random access memories (RAMs), erasable programmable read only memories (EPROMs), electrically erasable programmable read only memories (EEPROMs), flash memories, other forms of magnetic or optical storage media, or any type of storage media suitable for storing computer readable instructions and accessible to the computing device.

What is claimed is:

1. A method for a storage array, the method comprising:
hosting a storage management application on the storage array;
receiving, by the storage management application, a selected size of a volume to be created on the storage array and a selection of an application protection profile, the application protection profile specifying a replication of snapshots for application data to be stored on the volume on the storage array;
creating, by the storage management application, the volume with the selected size on the storage array, the volume created in accordance with the application protection profile;
hosting a management daemon on the storage array; and
managing, by the management daemon, the replication of snapshots in accordance with instructions provided by the application protection profile,
wherein in the managing of the replication of snapshots, the management daemon communicates with a protection manager agent installed on an application server communicatively coupled to the storage array.

2. The method of claim 1, wherein the application protection profile further specifies a scheduling of the snapshots.

3. The method of claim 2, wherein the management daemon further manages the scheduling of the snapshots in accordance with instructions provided by the application protection profile.

4. The method of claim 1, further comprising:
receiving, by the storage management application, a selection of an application performance profile, the application performance profile specifying performance parameters which optimize performance characteristics of one or more storage devices of the storage array to match requirements of an application executing on an application server communicatively coupled to the storage array.

5. The method of claim 4, wherein at least one of the performance parameters specifies one or more of a block size, data caching algorithm and data compression associated with the one or more storage devices of the storage array.

6. The method of claim 1, further comprising:
receiving, by the storage management application, access control rights for the volume to be created on the storage array.

7. A storage array, comprising:
a processor;
storage media communicatively coupled to the processor; and
a set of instructions on the storage media that, when executed by the processor, causes the processor to:
instantiate a storage management application on the storage array, the storage management application configured to (i) receive a selected size of a volume to be created on the storage array and a selection of an application protection profile, the application protection profile specifying a replication of snapshots for application data to be stored on the volume on the storage array, and (ii) create the volume with the selected size on the storage array and in accordance with the application protection profile; and
instantiate a management daemon on the storage array, the management daemon configured to manage the replication of snapshots in accordance with instructions provided by the application protection profile,
wherein to manage the replication of snapshots, the management daemon communicates with a protection manager agent installed on an application server communicatively coupled to the storage array.

8. The storage array of claim 7, wherein the application protection profile further specifies a scheduling of the snapshots.

9. The storage array of claim 8, wherein the management daemon further manages the scheduling of the snapshots in accordance with instructions provided by the application protection profile.

10. The storage array of claim 7, wherein the storage management application is further configured to receive a selection of an application performance profile, the application performance profile specifying performance parameters which optimize performance characteristics of one or more storage devices of the storage array to match requirements of an application executing on an application server communicatively coupled to the storage array.

11. The storage array of claim 10, wherein at least one of the performance parameters specifies one or more of a block size, data caching algorithm and data compression associated with the one or more storage devices of the storage array.

12. The storage array of claim 7, wherein the storage management application is further configured to receive access control rights for the volume to be created on the storage array.

13. The storage array of claim 7, wherein the management daemon is a logical portion of the storage management application.

14. A non-transitory machine-readable storage medium comprising software instructions that, when executed by a processor of a storage array, cause the processor to:
  instantiate a storage management application on the storage array, the storage management application configured to (i) receive a selected size of a volume to be created on the storage array and a selection of an application protection profile, the application protection profile specifying a replication of snapshots for application data to be stored on the volume on the storage array, and (ii) create the volume with the selected size on the storage array and in accordance with the application protection profile; and
  instantiate a management daemon on the storage array, the management daemon configured to manage the replication of snapshots in accordance with instructions provided by the application protection profile
    wherein to manage the replication of snapshots, the management daemon communicates with a protection manager agent installed on an application server communicatively coupled to the storage array.

15. The non-transitory machine-readable storage medium of claim 14, wherein the application protection profile further specifies a scheduling of the snapshots.

16. The non-transitory machine-readable storage medium of claim 15, wherein the management daemon further manages the scheduling of the snapshots in accordance with instructions provided by the application protection profile.

17. The non-transitory machine-readable storage medium of claim 14, wherein the storage management application is further configured to receive a selection of an application performance profile, the application performance profile specifying performance parameters which optimize performance characteristics of one or more storage devices of the storage array to match requirements of an application executing on an application server communicatively coupled to the storage array.

18. The non-transitory machine-readable storage medium of claim 17, wherein at least one of the performance parameters specifies one or more of a block size, data caching algorithm and data compression associated with the one or more storage devices of the storage array.

19. The non-transitory machine-readable storage medium of claim 14, wherein the storage management application is further configured to receive access control rights for the volume to be created on the storage array.

20. The non-transitory machine-readable storage medium of claim 14, wherein the management daemon is a logical portion of the storage management application.

* * * * *